US012562017B2

(12) United States Patent
Clark et al.

(10) Patent No.: US 12,562,017 B2
(45) Date of Patent: Feb. 24, 2026

(54) COIN APPARATUS

(71) Applicant: Innovative Technology Limited, Oldham (GB)

(72) Inventors: Paul Clark, Oldham (GB); Matthew Strong, Oldham (GB)

(73) Assignee: Innovative Technology Limited, Oldham (GB)

( * ) Notice: Subject to any disclaimer, the term of this patent is extended or adjusted under 35 U.S.C. 154(b) by 430 days.

(21) Appl. No.: 17/914,954

(22) PCT Filed: Mar. 16, 2021

(86) PCT No.: PCT/EP2021/056655
§ 371 (c)(1),
(2) Date: Sep. 27, 2022

(87) PCT Pub. No.: WO2021/204500
PCT Pub. Date: Oct. 14, 2021

(65) Prior Publication Data

US 2023/0141075 A1 May 11, 2023

(30) Foreign Application Priority Data

Apr. 8, 2020 (GB) ...................................... 2005234

(51) Int. Cl.
*G07D 5/02* (2006.01)
*G07D 9/00* (2006.01)

(52) U.S. Cl.
CPC ............... *G07D 5/02* (2013.01); *G07D 9/008* (2013.01)

(58) Field of Classification Search
CPC ................................. G07D 5/02; G07D 9/008
(Continued)

(56) References Cited

U.S. PATENT DOCUMENTS 4,815,579 A * 3/1989 Fritz ........................ G07D 5/02 194/335
6,068,102 A * 5/2000 Kawase ................... G07D 5/02 194/317
(Continued)

FOREIGN PATENT DOCUMENTS

CA 2425411 1/1998
CN 85107241 11/1986
(Continued)

OTHER PUBLICATIONS

International Search Report dated Jun. 10, 2021 in PCT/EP2021/056655.

(Continued)

*Primary Examiner* — Jeffrey A Shapiro
(74) *Attorney, Agent, or Firm* — Woodard Emhardt Henry Reeves & Wagner LLP

(57) ABSTRACT

A coin handling apparatus (1) comprising: a coin reservoir (2) including a coin output aperture (3); a coin output conduit (4) in communication with, and adjacent to, said coin output aperture (3); a coin separating mechanism (5) disposed between the coin output aperture (3) and the coin output conduit (4), said coin separating mechanism (5) comprising at least one gate member (9, 9A, 9B) including a pair of opposing resiliently biased support posts (10, 10A, 10B); wherein the at least one of the pair of opposing resiliently biased support posts (10, 10A, 10B) is configured to reciprocate within the magnetic field of a proximal inductor (11).

8 Claims, 4 Drawing Sheets

(58) Field of Classification Search
USPC .......................................... 194/335; 702/170
See application file for complete search history.

(56) References Cited

U.S. PATENT DOCUMENTS

| | | | | |
|---|---|---|---|---|
| 6,352,472 | B1 | 3/2002 | Tsuchida | |
| 8,668,559 | B2 * | 3/2014 | Bellis | G07D 9/008 453/57 |
| 12,020,528 | B2 * | 6/2024 | Dellas | G07D 7/164 |
| 2012/0150466 | A1 * | 6/2012 | Linn | G01N 29/265 702/170 |

FOREIGN PATENT DOCUMENTS

| | | | |
|---|---|---|---|
| CN | 204087327 | U | 1/2015 |
| CN | 106898076 | | 6/2017 |
| EP | 1842168 | B1 | 1/2012 |
| EP | 2410495 | A1 | 1/2012 |
| EP | 2819105 | A1 | 12/2014 |
| EP | 2819104 | | 12/2019 |
| GB | 1255492 | A | 12/1971 |
| JP | 2002157630 | | 5/2002 |

OTHER PUBLICATIONS

Search Report from GB2005234.6 dated Sep. 7, 2020.
WO2021/204500 Written Opinion Oct. 14, 2021.
CN106898076 machine translation.
CN202180027034.8 first office action translation in related case.
CN85107241 machine translation.
EP2819104 machine translation.
JP2002157630 machine translation.

* cited by examiner

COIN APPARATUS

The present invention generally relates to improvements in relation to coin handling apparatus. In particular, the present invention relates to mechanisms for determining the thickness of a single coin within a conventional coin handling apparatus.

A crucial function of many coin handling apparatus is to identify and authenticate the denomination of coins received by the apparatus. Conventional techniques for identifying coins include the analysis of various coin characteristics. Some, for example, interrogate the electromagnetic or acoustic response of the coin. These techniques may be augmented by testing the dimension of the coin, for example determining the coin diameter.

In order to physically interrogate a coin, it is necessary for some conventional coin apparatus to include a mechanism to isolate and extract a single coin from a bulk supply of coins received by the coin apparatus. An example of a method and device for "singulating" coins is discussed and described in EP 1,842,168. An adaption to the method and device of EP 1,842,168 is disclosed in GB 2,527,507.

In the prior art mentioned above, coins are separated by at least one stripping gate member. The gate member is spring-biased to reciprocate in a direction orthogonal to the direction of travel of the coins. In this way coins are individually separated from one another prior to traversing a validating sensor device for authentication.

A problem arising from prior art coin handling apparatus is that "singulating" and "authenticating" operations are handled by separate devices. The present invention seeks to address this problem.

According to an aspect of the present invention there is provided a coin handling apparatus as defined in claim 1.

Preferably, the coin separating mechanism comprises: a first gate member including a pair of opposing resiliently biased support posts; and a second gate member including a pair of opposing resiliently biased support posts, said second gate member disposed adjacent to said first gate member; wherein at least one support post of the first gate member and the second gate member is configured to reciprocate within the magnetic field of the inductor.

Preferably, the inductor is a coil connected to a control unit or a pair of adjacent coils connected to a control unit.

Advantageously, the control unit includes a coin thickness analyser configured to receive a coil induction signal, the coil induction signal is proportional to the displacement of a gate member, and the coin thickness analyser is calibrated to determine the thickness of a coin interacting with a gate member from the coil induction signal. The coil induction signal is directly proportional to the thickness of the coin interacting with the gate member.

Preferably, the coil circumscribes a respective support post of both the first gate member and the second gate member.

Alternatively, a pair of adjacent coils circumscribe a respective support post of both the first gate member and the second gate member.

An embodiment of the present invention will now be described, by way of example only, with reference to the accompanying schematic drawings, in which.

Figure 1:
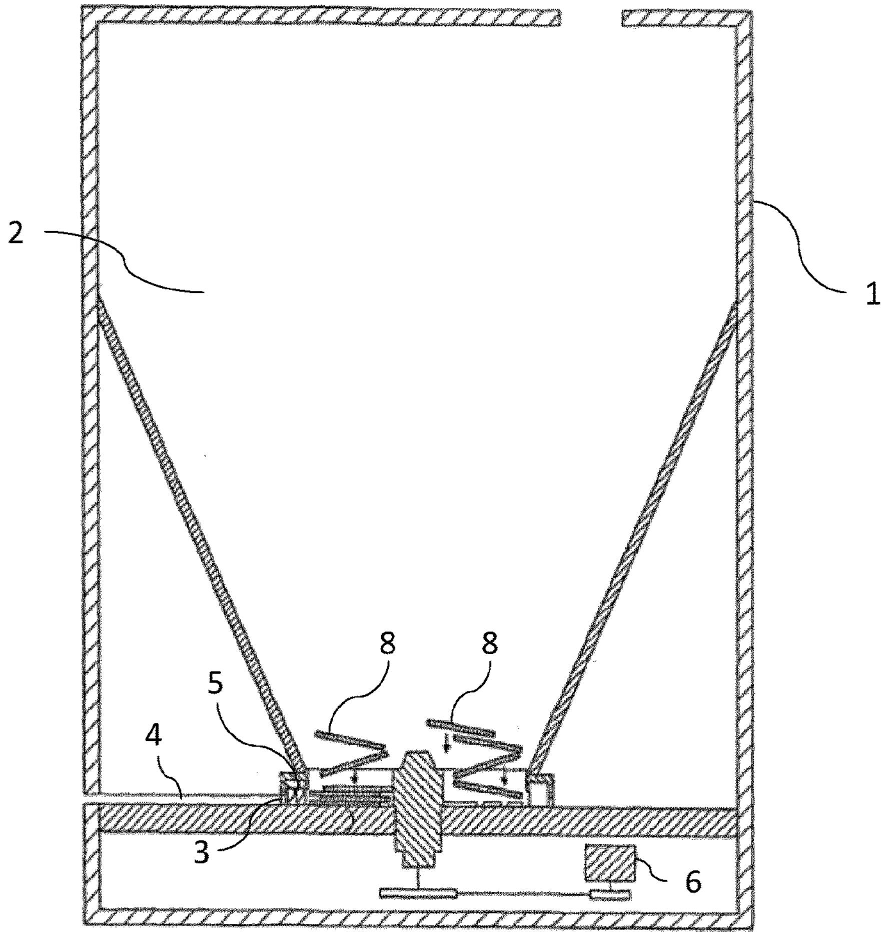
FIG. 1 shows a coin handling apparatus.

As shown in FIG. 1, a coin handling apparatus 1 comprises a coin reservoir 2 for receiving and storing coins 8. The coin reservoir 2 includes a coin sorting mechanism 7 located in a base region of the coin reservoir 2.

The coin sorting mechanism 7 includes a coin separating mechanism 5 located proximal to a coin output aperture 3. The coin output aperture 3 communicates with a coin output conduit 4.

The coin sorting mechanism 7, which is described fully in EP 1,842,168, is independently driven by an electric motor 6.

Figure 2:
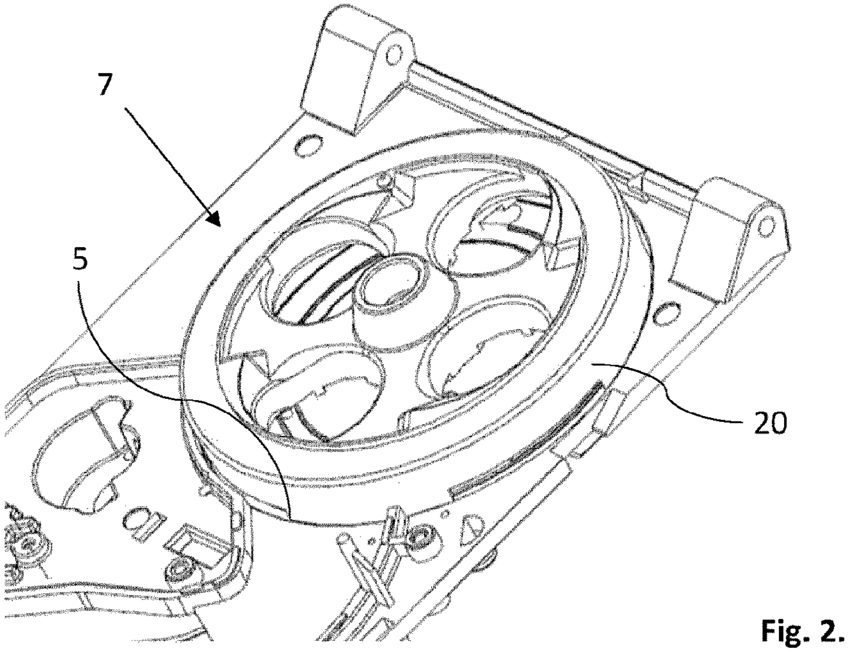
FIG. 2 shows a perspective view of coin sorting mechanism of the coin handling apparatus.

FIG. 2 illustrates the coin sorting mechanism 7 in more detail. The coin sorting mechanism 7 comprises a compartmentalised coin rotor 20 configured to transport coins from the coin reservoir 2 to the coin output aperture 3 via the coin separating mechanism 5.

Figure 3:
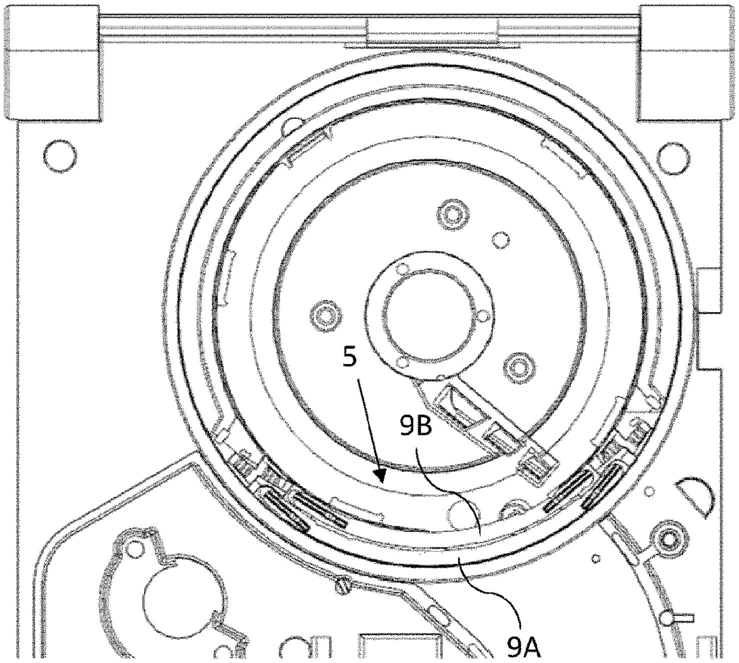
FIG. 3 shows a partial plan view of the coin sorting mechanism.

FIG. 3 shows a plan view of the coin sorting mechanism 7 with the coin rotor 20 removed. In the embodiment shown, the coin separating mechanism 5 comprises an outer gate member 9A and an inner gate member 9B. Each gate member is spring-biased to reciprocate vertically (see EP 1,842,168).

Figure 4:
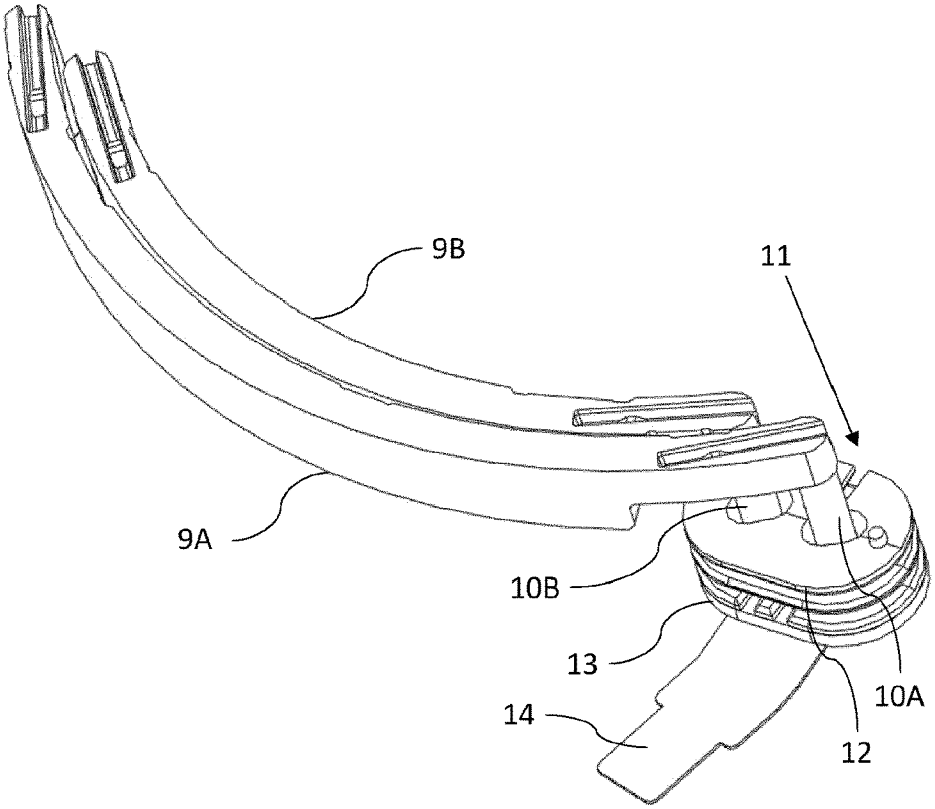
FIG. 4 shows a detailed view of a coin separating mechanism of the present invention.

With reference to FIG. 4, the outer gate member 9A and the inner gate member 9B are positioned adjacent to one another, and each of the gate members 9A, 9B are arcuate metal members. The outer gate member 9A includes a pair of support posts 10A (only one is shown in FIG. 4). Similarly, the inner gate member 9B includes a pair of support posts 10B. The support posts 10A, 10B are fabricated form the same metal as the respective gate member and are individual resiliently biased (not shown).

Figure 5:
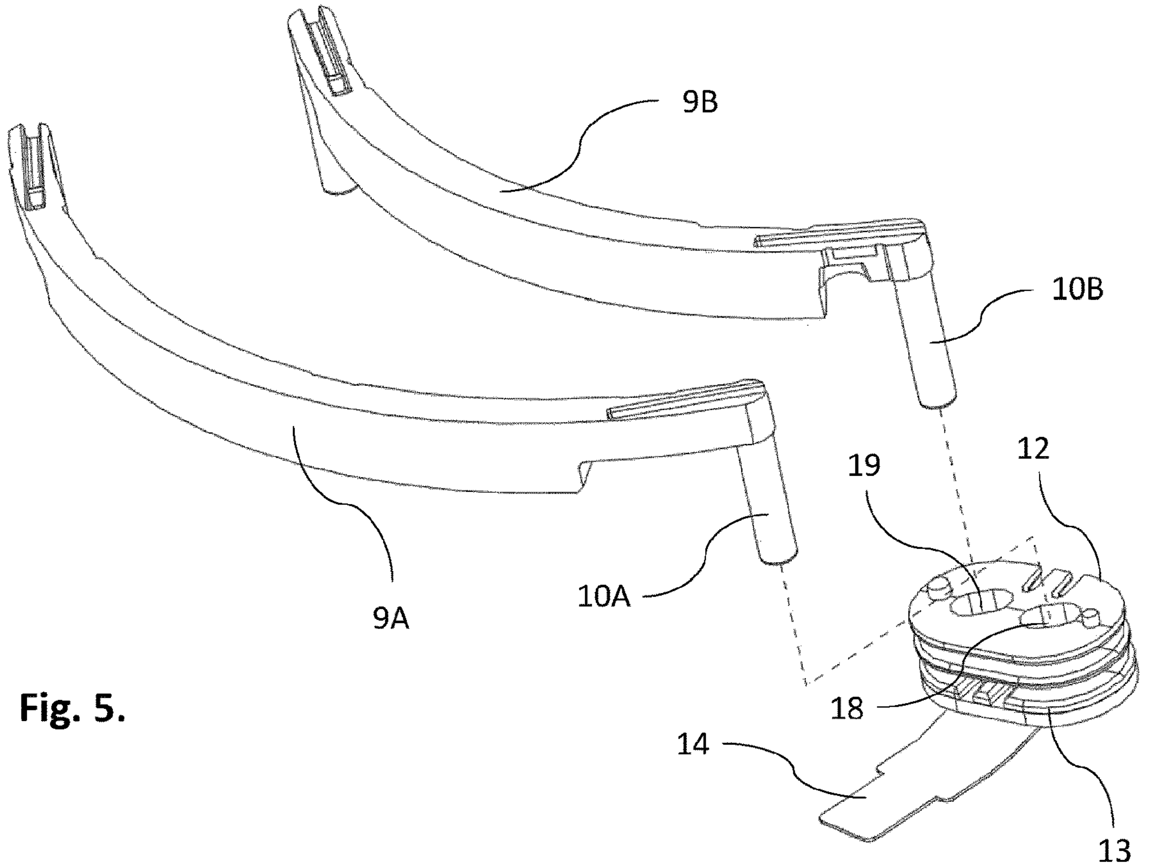
FIG. 5 shows an exploded view of the coin separating mechanism of FIG. 4.

With reference to FIGS. 4 and 5, each support post 10A, 10B is positioned to reciprocate within a respective receiving duct 18, 19 of an inductor housing 11.

The inductor housing 11 encloses an upper coil arrangement 12 and a lower coil arrangement 13. Although the coils are not shown in the Figures, the reader will be aware that any suitable coil known in the art can be employed to perform the required inductive task.

In the exploded view of a first embodiment shown in FIG. 5, the inductor housing 11 includes a pair of adjacent receiving ducts 18, 19 arranged to receive the outer gate support post 10A and the inner gate support post 10B respectively. In this embodiment, each gate member is independently reciprocal within respective receiving ducts.

Figure 6:
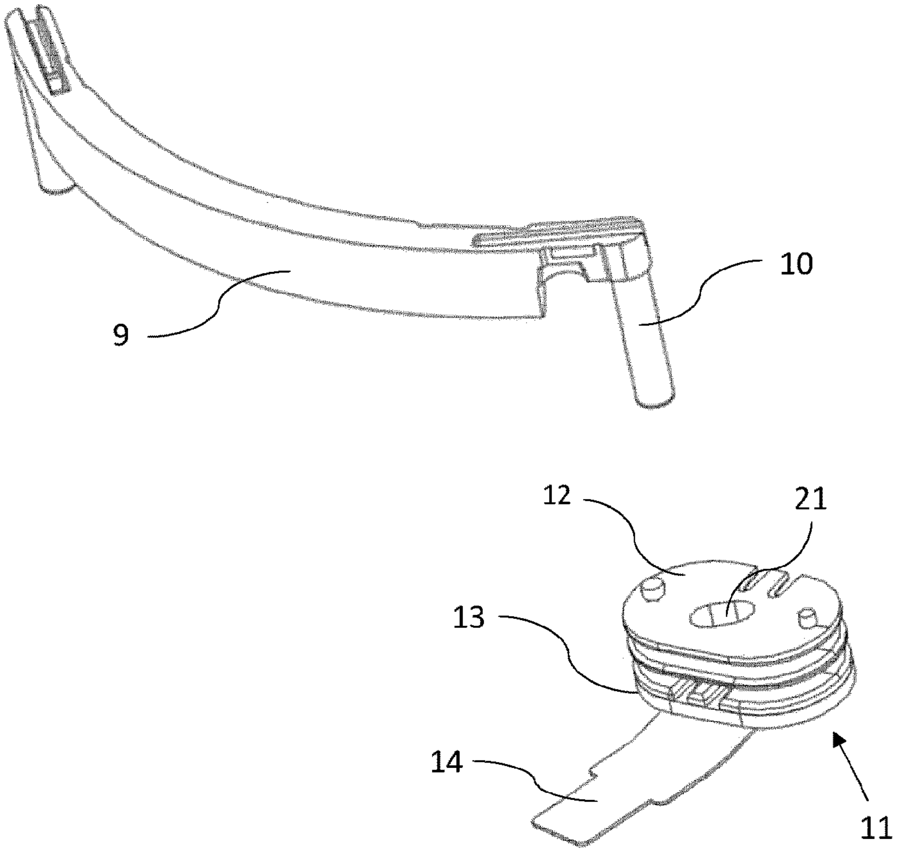
FIG. 6 shows an alternative embodiment of the coin separating mechanism of the present invention.

In an alternative embodiment, as shown in FIG. 6, the inductor housing 11 includes only a single support post receiving duct 21. Here, the coin separating mechanism 5 either comprises only a single gate member 9, or the separating mechanism includes two gate members, but only one of the gate pair is configured to reciprocate within the inductor housing 11.

Figure 7:
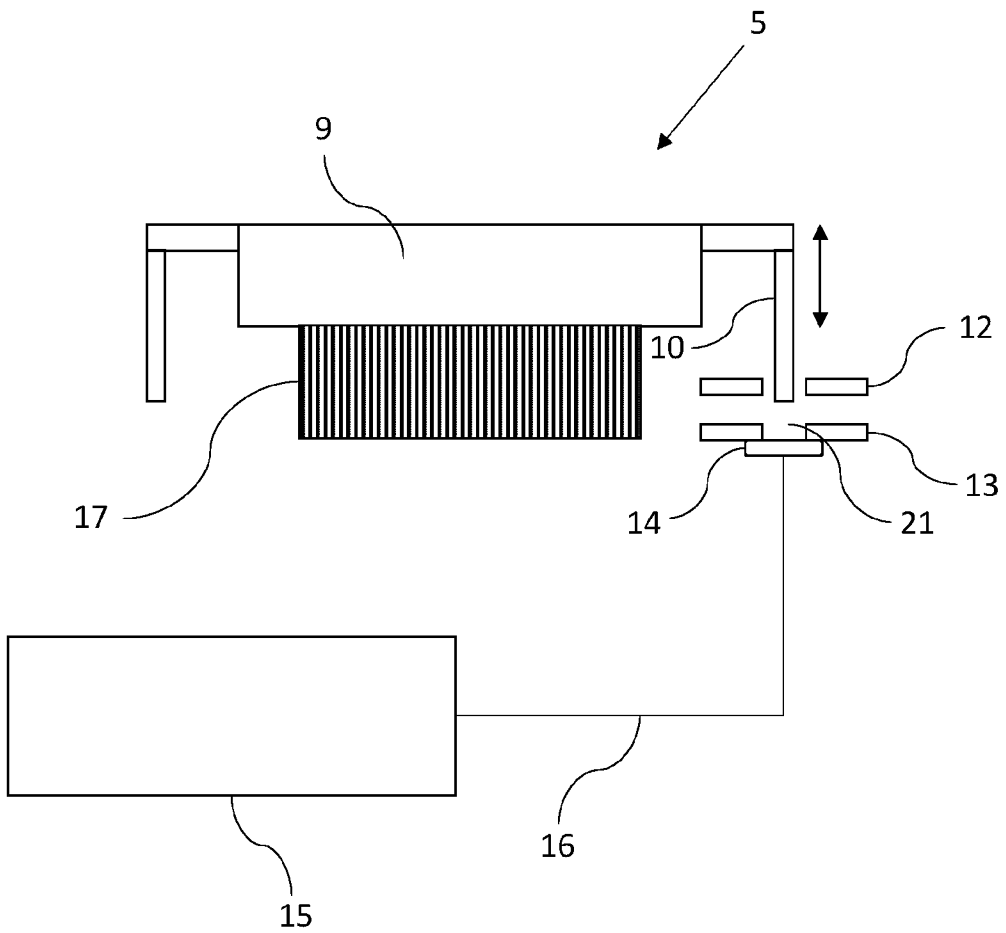
FIG. 7 shows a sectional view of the coin separating mechanism of the present invention.

Operation of the coin separating mechanism of the present invention will be described with reference to FIG. 7. Although FIG. 7 shows the operation of the alternative embodiment of FIG. 6, this is for simplicity only, and the operation of the inner and outer gate members 9B, 9A of the first embodiment shown in FIGS. 4 and 5 is identical save for the fact that the operation occurs twice in succession.

A coin 17 exiting the coin sorting mechanism 7 encounters the coin separating mechanism 5. The gate member 9 is urged upwards against the spring force to allow egress of the coin 17 from the coin output aperture 3 into the coin output conduit 4.

As the gate member 9 is urged upwards, the interconnected support post 10 is likewise urged to move upwards within receiving duct 21. The movement of the support post 10 induces a current in the upper coil arrangement 12 and the lower coil arrangement 13. This induced signal is transferred to a control unit 15 via the electrical connection tab 14 and interconnecting electrical link 16.

Typically, the control unit 15 is housed within the coin handling apparatus 1, and it may be incorporated within conventional authentication electronics or may be a separate unit in two-way communication with the internal authentication electronics. In any event, the control unit 15 comprises electronic circuitry and components configured to analyse and interpret the induced signal received from the electrical connection tab 14.

The control unit 15 is prior calibrated in order that the signal received can be directly converted to a value indicative of the thickness of the coin 17. Such a conversion of an induced signal pulse into a calibrated value can be performed by any suitable conventional method, and the skilled reader will be fully cognisant of such methods.

In the case of the first embodiment, the control unit 15 may receive a pair of induced signals. Here, the control unit 15 may compute the thickness value twice and make a comparison to infer a confidence level as to the correctness of the computed value. Alternatively, the pair of received signals may be combined prior to any computation as to the thickness of the coin 17.

The invention claimed is:

1. A coin handling apparatus comprising:

a coin reservoir including a coin output aperture;

a coin output conduit in communication with, and adjacent to, said coin output aperture;

a coin separating mechanism disposed between the coin output aperture and the coin output conduit, said coin separating mechanism comprising at least one gate member including a pair of opposing resiliently biased support posts;

characterised in that the at least one of the pair of opposing resiliently biased support posts is configured to reciprocate within the magnetic field of a proximal inductor, wherein the inductor comprises a coil connected to a control unit, and the control unit includes a coin thickness analyser configured to receive a coil induction signal, wherein the coil induction signal is proportional to the displacement of a gate member.

2. A coin handling apparatus as claimed in claim 1, wherein the coin separating mechanism comprises:

a first gate member including a pair of opposing resiliently biased support posts; and a second gate member including a pair of opposing resiliently biased support posts, said second gate member disposed adjacent to said first gate member;

wherein at least one support post of the first gate member and the second gate member is configured to reciprocate within the magnetic field of the inductor.

3. A coin handling apparatus as claimed in claim 1, wherein the inductor comprises a pair of adjacent coils connected to a control unit.

4. A coin handling apparatus as claimed in claim 1, wherein the control unit includes a coin thickness analyser configured to receive a coil induction signal, the coil induction signal is proportional to the displacement of a gate member.

5. A coin handling apparatus as claimed in claim 4, wherein the coin thickness analyser is calibrated to determine the thickness of a coin interacting with a gate member from the coil induction signal.

6. A coin handling apparatus as claimed in claim 5, wherein the coil induction signal is directly proportional to the thickness of the coin interacting with the gate member.

7. A coin handling apparatus as claimed in claim 1, wherein the coil circumscribes a respective support post of both the first gate member and the second gate member.

8. A coin handling apparatus as claimed in claim 3, wherein the pair of adjacent coils circumscribe a respective support post of both the first gate member and the second gate member.

* * * * *